(12) United States Patent
Shuster et al.

(10) Patent No.: US 6,308,882 B1
(45) Date of Patent: Oct. 30, 2001

(54) METHOD FOR JOINING DUCTILE IRON AND STEEL

(75) Inventors: Mark Shuster, Toledo, OH (US); Gregory Allen Fett, Fort Wayne, IN (US); James Andrew Duggan, Temperance, MI (US); Oscar Mnushkin, Northbrook, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/394,040

(22) Filed: Sep. 13, 1999

(51) Int. Cl.⁷ .......................... B23K 20/12; B23K 31/02; B23K 26/00
(52) U.S. Cl. ................ 228/175; 228/112.1; 228/248.1; 219/121.64
(58) Field of Search .................... 219/121.64, 121.8; 228/248.5, 112.1, 113, 114.5, 175, 178, 248.1

(56) References Cited

U.S. PATENT DOCUMENTS

| | | |
|---|---|---|
| 3,449,545 | 6/1969 | Petitt . |
| 3,778,588 * | 12/1973 | Bishel . |
| 3,798,011 * | 3/1974 | Sharp, Jr. . |
| 4,391,636 | 7/1983 | Windish . |
| 4,535,793 * | 8/1985 | Olson et al. . |
| 4,726,854 * | 2/1988 | Olson et al. . |
| 4,794,685 | 1/1989 | Hillier . |
| 4,817,859 | 4/1989 | Bretitenmoser et al. . |
| 4,959,518 * | 9/1990 | Reynolds, Jr. . |
| 5,303,985 | 4/1994 | Barnholt et al. . |
| 5,422,071 | 6/1995 | Kiser . |
| 5,678,753 | 10/1997 | Stauder . |
| 5,902,498 * | 5/1999 | Mistry et al. . |

FOREIGN PATENT DOCUMENTS

359058318A * 4/1984 (JP) .

* cited by examiner

Primary Examiner—Tom Dunn
Assistant Examiner—Kiley Stoner
(74) Attorney, Agent, or Firm—Rader, Fishman & Grauer PLLC

(57) ABSTRACT

A method for joining ductile iron with steel includes the steps of depositing a metallic material between a first ductile iron component, and a second steel component. The joint formed by the method has an interface disposed between the two components and the first and second components are welded thereto. The interface includes the metallic material. The metallic material preferably includes nickel sprayed to the joint area. The resulting interface material is a weld bead zone that preferably includes nickel at a concentration ranging from about twenty-two percent to about thirty-two percent, most preferably between about thirty percent and about thirty-two percent. The welding step of the present invention preferably includes the use of laser energy to localize fusion of the components and the metallic material.

8 Claims, 2 Drawing Sheets

METHOD FOR JOINING DUCTILE IRON AND STEEL

FIELD OF THE INVENTION

The present invention relates generally to the welding of steel to ductile iron. More particularly, the invention relates to formation of an interface between a steel component and a ductile cast iron component by means of arc, laser, and/or friction welding.

BACKGROUND OF THE INVENTION

Creating a joint or weld between materials having dissimilar thermal expansion and contraction characteristics is a long-standing problem. While desirable, it has been a challenge to unite such materials by means of a bond or weld that possesses inherent physical strength that is equal to or greater than that of the materials being welded. In particular, problems arise when dissimilar metals contract at different rates upon weld completion. The variation in the contraction rates of the metals causes internal stresses, resulting in cracking or weakening of the structure. The problem of varying contraction rates is particularly acute when joining steel and ductile iron.

Moreover, a major technical challenge concerns preventing the formation of cracks due to residual stresses surrounding a welded joint through component use long after a weld is created. When steel and ductile iron are involved, the welded structure has a large heat affected zone that surrounds the joint, as well as a tendency to become brittle around the joint due to carbon transfer from the steel into the iron matrix. Additionally, when a NiRod 55 is used to join ductile iron to steel, as is the current practice, some crevice corrosion eventually appears in the region surrounding the joint. Accordingly, it is desirable to provide a robust, rapid, and reliable process for joining steel with ductile iron, where the resulting joint has a minimal heat affected zone, maximum fatigue strength, and high corrosion resistance.

SUMMARY OF THE INVENTION

The invention includes a method for joining ductile iron with steel. First, a metallic material is deposited between a first ductile iron component and a second steel component. Then an interface material is formed that includes the metallic material by welding the first and second components to the metallic material. The metallic material preferably includes nickel at a concentration greater than or equal to about seventy percent. When nickel is used, it may be applied in the form of a self-fluxing material of about seventy percent nickel. Preferably, however, an exothermic powder is sprayed to the joint area, where the powder includes about ninety-five percent nickel and about five percent aluminum. In any event, the resulting interface material is a weld bead zone that preferably includes nickel at a concentration ranging from about twenty-two percent to about thirty-two percent, and most preferably between about thirty percent and about thirty-two percent.

The welding step of the present invention preferably includes the use of laser energy to localize fusion of the components and the metallic material. The laser energy can be applied in a spiral to form the bead zone, resulting in a stronger overall weld. Alternatively, a friction weld may be used to combine the components. The friction weld may be used alone or may be followed by either arc welding or laser welding.

As one example of the first invention, the first component is a ductile iron steering yoke, and the second component is a steel tube. As a second example, the first component and said second component are combined to form an automobile axle.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

The present invention is directed to a welding process where a soft interface is produced between a steel component and a ductile iron component as shown in the Figures. As a first example of an application of the invention, shown in FIGS. 1A to 1C, a ductile iron yoke 11 is joined with steel tubing 12 to form a driveshaft 13 for an automobile.

Figure 1A:
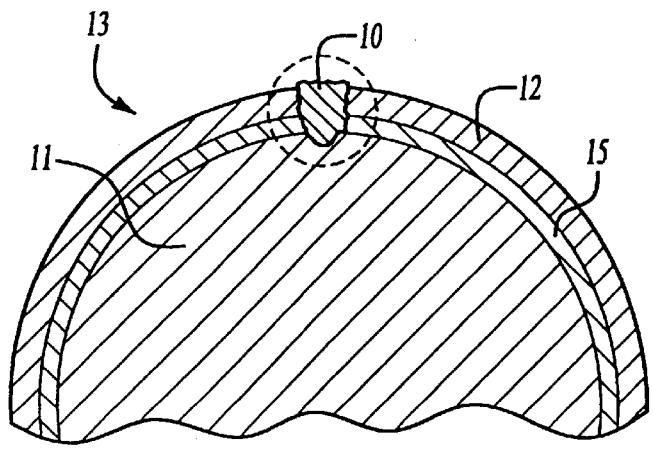
FIG. 1A is a cross sectional view of a driveshaft welded according to the principles of the present invention.
Figure 1B:
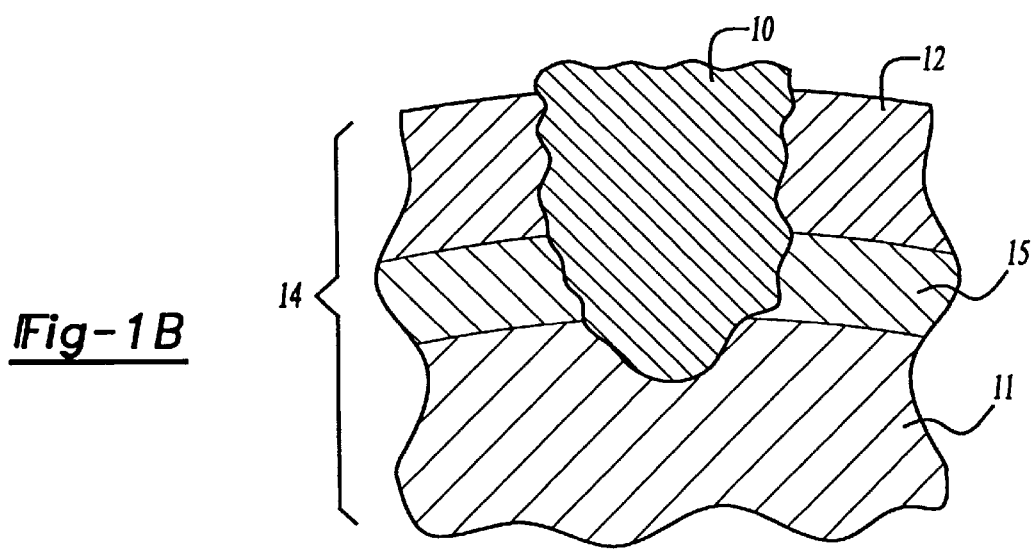
FIG. 1B is a close-up cross sectional view of the driveshaft shown in FIG. 1A.
Figure 1C:
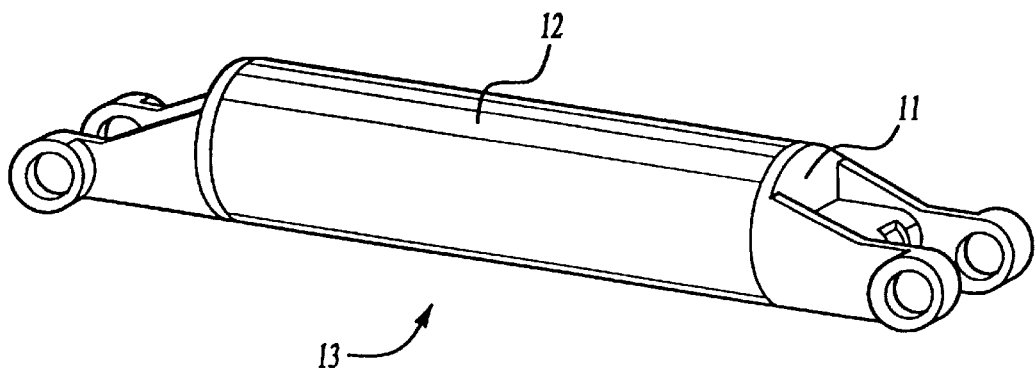
FIG. 1C is a plan view of a driveshaft having a ductile iron component and a steel component.

In a first embodiment of the invention according to the first example, the driveshaft 13 is manufactured by first applying a metal based coating 15 such as a nickel based coating, a stainless steel based coating, or a copper based coating, to a region 14 of the ductile iron yoke 11 and/or the steel tubing 12 where these components 11, 12 will be joined together. The metal based coating 15 can be applied while welding the driveshaft components 11, 12 using a metal wire. When a metal based wire is used in an arc welding method, it is preferred that the welding deposition wire be a self fluxing material including about seventy percent nickel. As a welding energy source, a torch for arc welding may be applied. However, laser welding is especially proficient at allowing the nickel influence to provide crack-free weld, a small heat affected zone, and less brittleness in the welded metal. As shown in FIGS. 1A and 1B, the weld 10 is formed by using a laser of sufficient energy to penetrate the steel 12 and pre-sprayed nickel-based coating 15, and further penetrate into the ductile iron yoke 11. Also, to increase weld strength, the laser can make several spiraling passes around a joint. While heat can be spirally applied to the joint using a torch, a laser can more precisely allow each spiraling pass to be sufficiently close to the weld made during a previous pass without interfering with the existing weld.

It is preferred that in the first embodiment of the invention according to the first example, a nickel based spray coating 15 is applied to either the steel tubing 12 and/or the ductile iron yoke 11 prior to their being combined, instead of applying a nickel flux while welding. Deposition of nickel based material using modern spray technology provides the advantages of increased control of the amount and location of the aluminum based material deposited. Furthermore, the performance and flexibility of the resulting ductile iron and steel combination can be more easily controlled, and the combination can be manufactured much more cheaply than when a nickel flux is used to deposit during welding. An exothermic aluminide nickel powder containing approximately ninety-five percent nickel and five percent aluminum exhibits especially good adhesion to the surfaces of the components 11, 12. In any case, it is preferred that the interface 10 formed between the components 11, 12 resulting from whichever type of welding is performed contains between about twenty-two percent and about thirty-two percent nickel, and most preferably between about thirty percent to about thirty-two percent. Accordingly, depending on the design of the joint, a variety of laser weld parameters as well as coating depths and shapes can be created to achieve the interface having the preferred concentration of nickel therein.

When the nickel based spray coating 15 is applied prior to combining the components 11, 12, the components may also be joined by a friction (inertia) weld. While a friction weld is a rapid process, and in many cases is sufficiently reliable for maintaining the fusion of the involved components, reliability of the weld is greatly improved when the friction weld is followed by a laser weld. Furthermore, following the friction weld with a laser weld as described above vastly improves the ability to ensure that the interface between the components 11, 12 has nickel present in the preferred concentration ranges set forth above. Also, the knifelike laser welding provides for intense and localized fusion of the components 11, 12 and the nickel based material 15, and allows the weld to be precisely shaped and angled. This approach allows for sufficient flexibility to create robust technology.

Figure 2A:
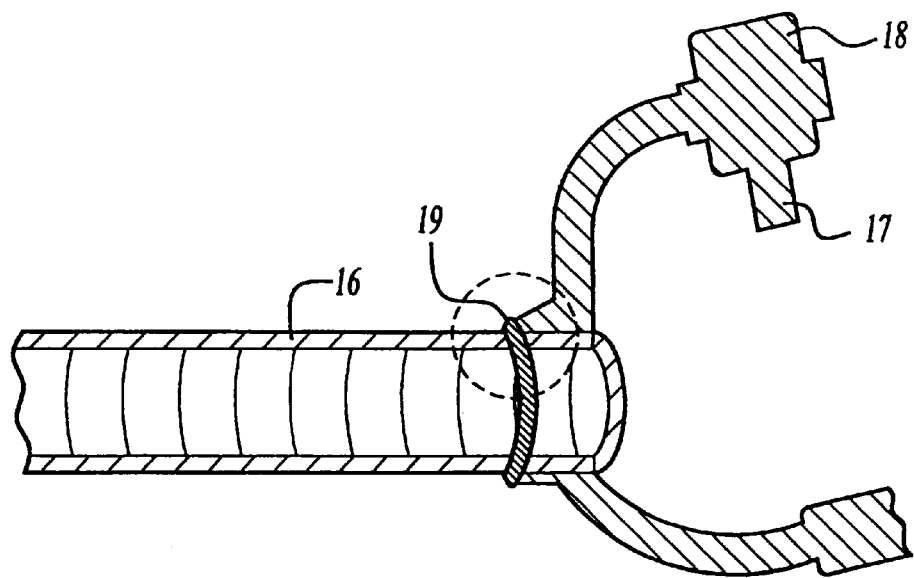
FIG. 2A is a cross sectional view of a light axle welded according to the principles of the present invention.
Figure 2B:
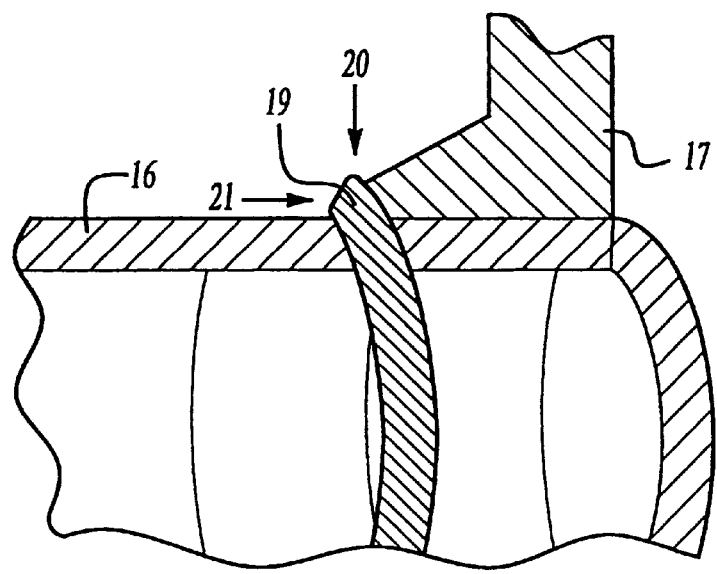
FIG. 2B is a close-up cross sectional view of the light axle shown in FIG. 2A.

As a second example of an example of the invention, shown in FIGS. 2A and 2B, a steel tube 16 is joined with ductile iron 17 to form an automobile axle 18. The weld bead 19 surrounds the circumferences of both the steel tube 16 and the ductile iron component 17 to form an interface between the two components. Depending on factors such as thickness of the components to be welded, welding energy source, and so forth, the weld can be formed by applying energy perpendicular to the length of the steel tubing 16, as shown by arrow 20, or parallel to the length of the steel tubing 16 as shown by arrow 21.

In a second embodiment of the invention according to the second example, the axle 18 is manufactured by first applying a metal based coating (not shown, as the weld 19 is completed in FIGS. 2A and 2B) such as a nickel based coating, a stainless steel based coating, or a copper based coating, to a region of the ductile iron 17 and/or the steel tubing 16 at a region where these components 16, 17 will be joined together. The metal based coating can be applied while welding the axle components 16, 17 using a metal wire, preferably a self fluxing material including about seventy percent nickel as described in the first example. As a welding energy source, laser welding is preferred for its advantages set forth above. Furthermore, to increase weld strength, the laser can make several spiraling passes around a joint, where each pass can strengthen the overall weld without interfering with the weld formed by the previous pass.

It is again preferred that a nickel based spray coating is applied to either the steel tubing 16 and/or the ductile iron 17 prior to their being combined, instead of applying a nickel flux while welding, for the same reasons set forth above. Again, it is preferred that the interface weld 19 formed between the components 16, 17 contains between about twenty-two percent and about thirty-two percent nickel, and most preferably between about thirty percent to about thirty-two percent. Accordingly, depending on the design of the joint, a variety of laser weld parameters as well as coating depths and shapes can be created to achieve the interface having the preferred concentration of nickel therein. A friction weld may also be formed alone, or preferably be coupled with a subsequent laser weld to combine the axle components 16, 17.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed is:

1. A method of joining ductile iron to steel, comprising:
    depositing a metallic material between a ductile iron component and a steel component;
    forming a weld between the ductile iron component and the steel component, wherein the weld includes 22–32% nickel and wherein the deposited metallic material is an exothermic powder of about 95% nickel.

2. The method of claim 1, wherein the weld includes 30–32% nickel.

3. The method of claim 1, wherein the depositing step includes spraying the powder onto the ductile iron component or the steel component.

4. The method of claim 1, wherein the weld is formed by friction welding followed by laser welding or arc welding.

5. The method of claim 1, wherein the ductile iron component is a steering yoke and the steel component is a tube.

6. The method of claim 1, wherein the ductile iron component and the steel component combine to form an automobile axle.

7. The method of claim 1, wherein the weld is formed by laser welding.

8. The method of claim 7, wherein the laser weld is a spiral weld.

* * * * *